United States Patent [19]

Moores

[11] Patent Number: 5,894,532
[45] Date of Patent: Apr. 13, 1999

[54] POLARIZATION DESENSITIZER

[75] Inventor: John D. Moores, Concord, Mass.

[73] Assignee: Massachusetts Institute of Technology, Cambridge, Mass.

[21] Appl. No.: 08/833,409

[22] Filed: Apr. 4, 1997

[51] Int. Cl.$^6$ .................................................. G02B 6/00
[52] U.S. Cl. ............................................................. 385/11
[58] Field of Search ...................... 250/461.2; 348/207, 348/335; 345/207; 359/247, 495, 63, 65; 385/11, 197

[56] References Cited

U.S. PATENT DOCUMENTS 4,429,230  1/1984  Honkawa et al. ................ 250/461.2
5,557,324  9/1996  Wolff .................................. 345/207

*Primary Examiner*—Akm E. Ullah
*Attorney, Agent, or Firm*—Testa, Hurwitz & Thibeault, LLP

[57]  ABSTRACT

A polarization desensitizing method and apparatus including a polarization analyzer separating a polarized input pulse into two orthogonally polarized components separated in time; and a nonlinear switch integrating the power of the two orthogonally polarized components over a predetermined time and producing an output pulse having a predetermined polarization. In one embodiment the polarization desensitizer includes a polarization analyzer in communication with a data source providing data pulses; a pulse generator; and a polarization converting switch in communication with both the polarization analyzer and the pulse generator, the polarization converting switch producing output pulses of a known polarization in response to the data pulses.

18 Claims, 4 Drawing Sheets

POLARIZATION DESENSITIZER

GOVERNMENT SUPPORT

This invention was made with government support under Contract Number MDA 972-92-J-1038 awarded by the Advanced Research Projects Agency. The government has certain rights in the invention.

FIELD OF THE INVENTION

The invention relates to the field of optical devices and more particularly to the field of optical switching devices.

BACKGROUND OF THE INVENTION

The sensitivity of many optical and electro optical devices to the polarization of the incoming light pulses poses a serious problem in many optical systems including optical communications systems and optical computing systems. Although light pulses in such systems may be generated with a known polarization, as the light pulses propagate through the system the polarization may be changed by polarization drift which may in turn depend on the temperature and strains in the propagation medium, among other factors. Additionally, if a receiver in such a system is receiving light pulses generated by multiple sources in the system, not all sources will generate light pulses having the same initial polarization and as a result, even if there is no polarization drift, the receiver will not be receiving light pulses of one polarization from all the sources. By the term pulse it is meant a packet of optical energy of finite extent.

Previous attempts at developing polarization independent devices have been only partially successful because such devices tend to either be limited in bandwidth or are energy inefficient. For example one method of reducing polarization sensitivity is to preprocess the incoming signal so as to produce signals of a known predetermined polarization. One such device for accomplishing this utilizes an electro-optical polarization analyzer in conjunction with a polarization changing device. The polarization analyzer measures the polarization of the incoming light pulse and tunes the polarization state changing device to produce light pulses of the required polarization. The measurement and tuning required for such a system introduces both latency and bandwith limitations which may be unacceptable at high data rates.

Another device for reducing polarization sensitivity uses a polarizing beamsplitter to split the light pulse into two orthogonal linearly polarized components. One of the linear components is then rotated 90° so as to be aligned and then recombined with the other linear component with a time delay sufficient to avoid interference. Although this produces a closely spaced pair of output pulses of a known linear polarization, about half of the energy in the initial pulse is lost in the conversion process.

The present invention avoids the shortcomings of the prior art.

SUMMARY OF THE INVENTION

One aspect of the invention relates to a polarization desensitizer including a polarization analyzer separating an input pulse into two orthogonally polarized components separated in time and a nonlinear switch integrating the power of the two orthogonally polarized components over a predetermined time and producing an output pulse having a predetermined polarization.

In one embodiment the polarization desensitizer includes a polarization analyzer in communication with a data source providing data pulses; a pulse generator; and a polarization converting switch in communication with the polarization analyzer and the pulse generator. The polarization converting switch produces output pulses of a known polarization in response to the data pulses. In various embodiments the polarization converting switch includes a walk-through switch; a nonlinear loop mirror; a single arm interferometer or a semiconductor switch.

In another embodiment the polarization analyzer comprises a first polarizing beam splitter in communication with the data source; a pulse delayer in communication with the first polarization beam splitter; and a second polarizing beam splitter in communication with the pulse delayer, the first polarizing beam splitter and the polarization converting switch.

Another aspect of the invention relates to a pulse configure including a polarization analyzer in communication with a data source providing data pulses; a first pulse generator; and a polarization converting switch in communication with the polarization analyzer, and in communication with the first pulse generator, the polarization converting switch producing output pulses of a known polarization and energy in response to the data pulses.

Yet another aspect of the invention is a method for providing a fixed polarization pulse corresponding to a pulse having an undetermined polarization. The method includes the steps of separating the pulse having an undetermined polarization into two components separated in time; providing a reference pulse; and combining the reference pulse and the two components separated in time so as to produce an output pulse of a known polarization. In one embodiment the step of combining the reference pulse and said two components separated in time so as to produce an output pulse of a known polarization includes the step of cross phase modulating the reference pulse and the two components separated in time.

BRIEF DESCRIPTION OF THE DRAWINGS

The foregoing and other objects, features and advantages of the invention will become apparent from the following more particular description of preferred embodiments of the invention, as illustrated in the accompanying drawings, in which.

DESCRIPTION OF THE PREFERRED EMBODIMENTS

Figure 1:
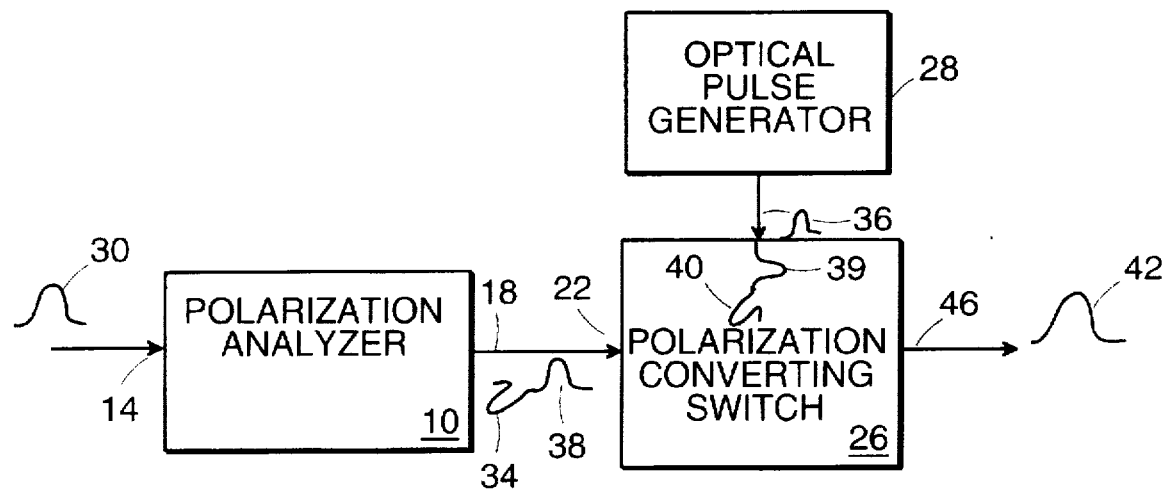
FIG. 1 is block diagram of an embodiment of the polarization desensitizer of the invention.

In brief overview and referring to FIG. 1, a device constructed in accordance with the teachings of this invention includes a polarization analyzer 10, having a first input port 14 and an output port 18 which is in communication with an input port 22 of a polarization converting switch 26. The polarization converting switch 26 is also in communication with an optical pulse generator 28 which generates pulses of a known polarization. The polarization analyzer 10 separates an input pulse, from a data source having energy E substantially of energies aE, and (1−a)E where 0<a<1 into two orthogonally polarized components, separated in time. The polarization converting switch 26 includes a non-linear medium in which pulse 36 from generator 28, separated into components 39, 40 as described below, travels at a different speed from either pulse 34 or 38 and in which interacting pulses can undergo phase shifts related to the energies of the interacting pulses. The arrival of the output pulse 36 from the pulse generator 28 is synchronized with the arrival of pulses 34 and 38 from the polarization analyzer 10 such that the pulses 34 and 38 interact with the components of pulse 36 in the polarization converting switch 26.

Thus when a pulse 30 of any polarization (whether or not uniformly polarized) enters the input port 14 of the polarization analyzer 10, the pulse 30 is separated into two orthogonally polarized components 34, 38 which are separated in time and which enter the input port 22 of the polarization converting switch 26. Each pulse 36 from optical pulse generator 28 enters the polarization converting switch and also is split into two equal energy pulses 39 and 40 in polarization converting switch 26. Once in the polarization converting switch 26, the two components 34, 38 travel at different speeds from pulses 39 and 40 created from the pulse entering the switch 26 from the optical pulse generator 28. The components 34, 38 are arranged to interact primarily with one pulse 39 of known polarization provided by the optical pulse generator 28. Within the polarization converting switch 26 each pulse 36 from the optical pulse generator 28 is converted into two component pulses 39 and 40 of known polarization. These two component pulses 39 and 40, of substantially equal energy, are substantially equally shaped orthogonally polarized pulses. Component pulse 39, in turn, has substantially equally shaped orthogonally polarized components which have substantially equal energy and which are copolarized with pulses 34 and 38. The same is true for component pulse 40. A phase shift proportional to the energy of the components 34,38 is imparted to the known polarization pulse 39 as the components travel through ("walk-through") the known polarization pulse 39. Pulses 39 and 40 are interferometrically recombined within the polarization switch 26, subsequent to the interaction with pulses 34 and 38, in such a way that in the absence of pulses 34 and 38, pulses 39 and 40 recombine destructively at output port 46, producing no substantial output. In the presence of pulses 34 and 38, the induced phase shift on pulse 39 results in partially constructive interference with pulse 40. An output pulse 42 of known polarization is therefore produced at the output port 46 of the polarization converting switch 26. It should be noted that in another embodiment, the switch is configured such that the output pulse is the inverse of the input pulse, thereby converting a "0" bit to a "1" bit and vice versa.

In a "walk-through" switch, in which the nonlinear medium of the switch includes optical fiber, the phase shift induced in one linearly polarized pulse 39 by a pair of pulses 34 and 38 passing through it, is given by the expression:

$$\Delta\Phi \ 2 \ [\tfrac{1}{2}(aE) + \tfrac{1}{2}((1-a)E))] + (2/3)[(aE/2) + \tfrac{1}{2}((1-a)E))] = 4/3(E)$$

where $\Delta\Phi$ is the phase change; $[\tfrac{1}{2}(aE) + \tfrac{1}{2}((1-a)E))]$ is the contribution due to the copolarized components; $|(aE/2) + \tfrac{1}{2}((1-a)E))|$ is the contribution due to the orthogonal components; and (a) and (E) are as described above. Thus this configuration is 33.3% more efficient than the configurations known to the prior art in which the phase shift is proportional to (E). In certain media, no specific relationship between the polarizations of the interacting pulses should be required.

Figure 2A:
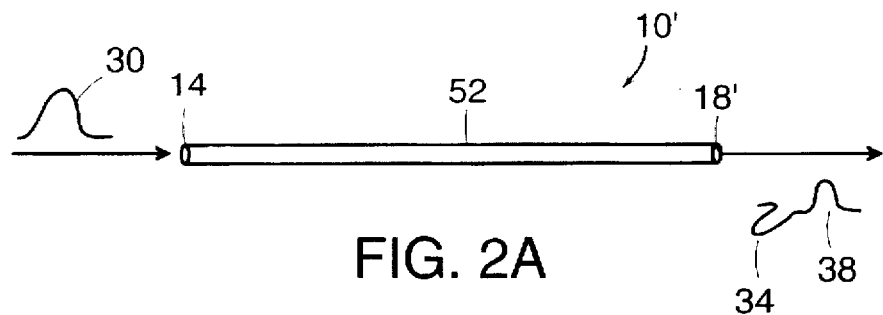
FIG. 2a is a highly schematic diagram of one embodiment of a polarization analyzer of the invention shown in FIG. 1.

Referring to FIG. 2a, one embodiment of polarization analyzer 10' includes a length of birefringent optical fiber 52. Such a birefringent optical fiber 52 divides an input pulse 30 into two orthogonal linearly polarized components 34, 38 which are separated in time. The length of fiber 52 and the strength of the birefringence are chosen such that the components 34 and 38 are properly separated in time. By properly, it is meant that the pulses are separated so that there is no substantial interference between pulses 34 and 38 but not separated so much that there is an inappropriate interaction in switch 26. If the energy of the input pulse is designated (E), then the energy of one of the components 34, 38 is substantially (aE) and the energy of the other of the components is substantially ([1−a]E), where 0<a<1.

Figure 2B:
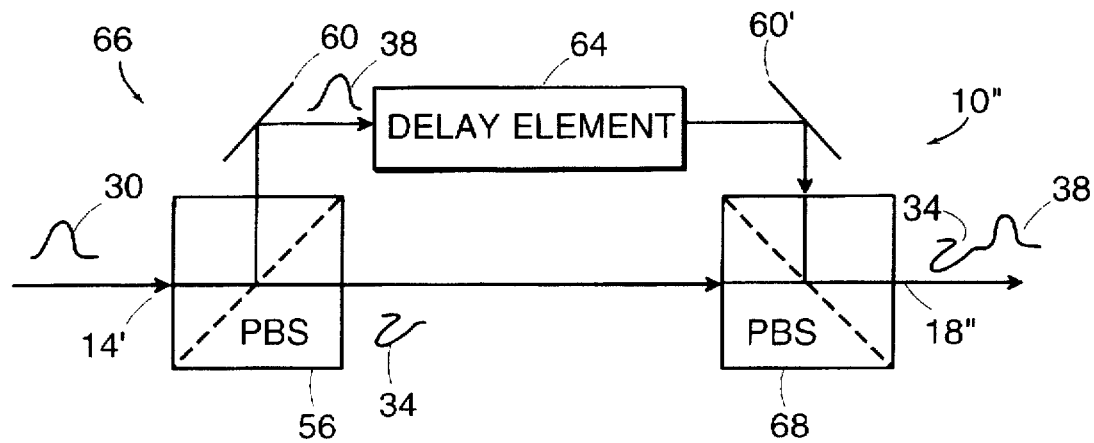
FIG. 2b is a highly schematic diagram of another embodiment of a polarization analyzer of the invention shown in FIG. 1.

Referring to FIG. 2b, another embodiment of a polarization analyzer 10" for use in the invention includes a first polarizing beam splitter 56, two beam directors 60, 60' a delay element 64 and a second polarizing beam splitter 68. When a light pulse 30 enters the first polarizing beam splitter 56, the pulse 30 is separated into two orthogonal linearly polarized components 34, 38. One polarized component 38 is reflected by a beam director 60 such as a mirror into a delay element 64. In one embodiment the delay element 64 is simply a longer path length. Once the polarized component 38 leaves the delay element 64 and is reflected by beam director 60' into a second beam splitter 68, it is delayed in time relative to the other polarized component 34 which is also directed into the second beam splitter 68 by the first beam splitter 56. The second beam splitter 68 recombines the two polarized components at its output 18' into two orthogonal linearly polarized components 34, 38 separated in time. In general, the pulse delay may be located anywhere in the optical path 66 between the two polarizing beam splitters 56, 68.

Figure 3:
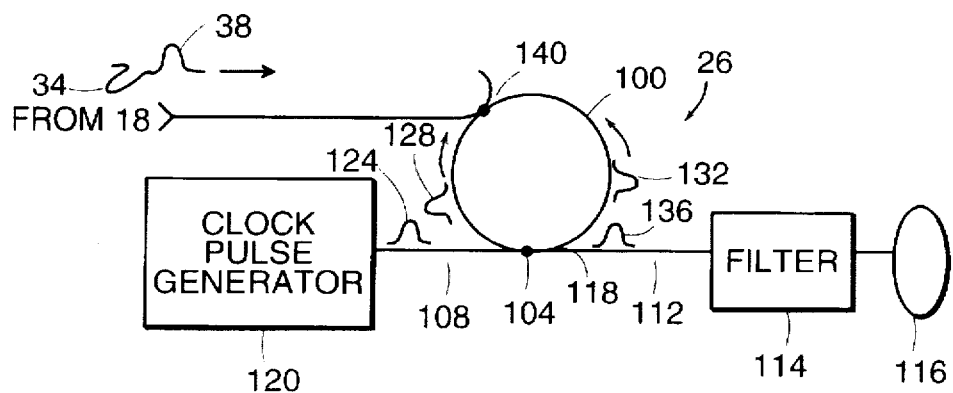
FIG. 3 is a highly schematic diagram of an embodiment of a polarization converting switch and optical pulse generator of the invention shown in FIG. 1.

Referring to FIG. 3, one embodiment of a polarization converting switch 26 which may be used with the polarization analyzer (generally 10) is termed a "walk-through" switch. In one embodiment this switch includes a Sagnac type interferometer constructed from a loop of a optical fiber 100 formed with a 50:50 coupler or beam splitter 104 to provide an input port 108 and an output port 112 to the fiber loop 100. A detector 116 is in communication with the output port 112 through an optical band pass filter 114 or dichroic coupler and an optical pulse generator or clock pulse generator 120 is in communication with the input port 108. The filter 114 blocks components 34, 38 from reaching the detector 116. In another embodiment the optical band pass filter or dichroic coupler is located at location 118 in the loop 100 adjacent coupler 104.

In this embodiment of the Sagnac type interferometer, a pulse 124 from the clock or optical pulse generator 120 is introduced into an optical fiber loop 100 from the input port 108 by way of the 50:50 optical coupler 104 or beam splitter. The clock or optical pulse generator 120, may be constructed from a mode locked laser, a solutions laser or any other optical clock source known to one skilled in the art. The optical coupler 104 splits the pulse 124 into two counter propagating pulses 128, 132 which travel around the loop 100. If both of the pulses 128,132 are undisturbed during their propagation, they will recombine at the optical coupler 104 and reform a single pulse which will leave the loop 100 by passing back out through the input port 108. A pulse remover such as a Faraday circulator (not shown) removes the back propagating pulse to prevent its disturbing the output of clock pulse generator 120. If either pulse 128, 132 is changed relative to the other pulse, such as being phase shifted or simply delayed, a pulse 136 will leave the loop by way of the output port 112 and be detected by the detector 116. The Sagnac interferometer in this embodiment is constructed such that normally all the pulses 124 entering the loop 100 from the clock or optical pulse generator 120 traverse the loop 100 and exit from the same port 108 from which they were input. Also, in one embodiment, the Sagnac interferometer includes a polarization controller (not shown) in the loop 100 which controls the polarization state of the optical signals in the interferometer.

In the embodiment of the polarization converting switch 26 shown, the loop 100 includes a second coupler 140, by which the two orthogonal linearly polarized components 34, 38 separated in time, are introduced into the loop 100 from the output (generally 18) of the polarization analyzer (generally 10). The polarization of component 34 is ±45° from the polarization of component 128 in loop 100. The clock pulse 124 from the clock pulse generator 120 is synchronized with the pulses 34, 38 from the polarization analyzer 10 so as to permit proper interaction of the pulses within the loop 100.

Figure 4:
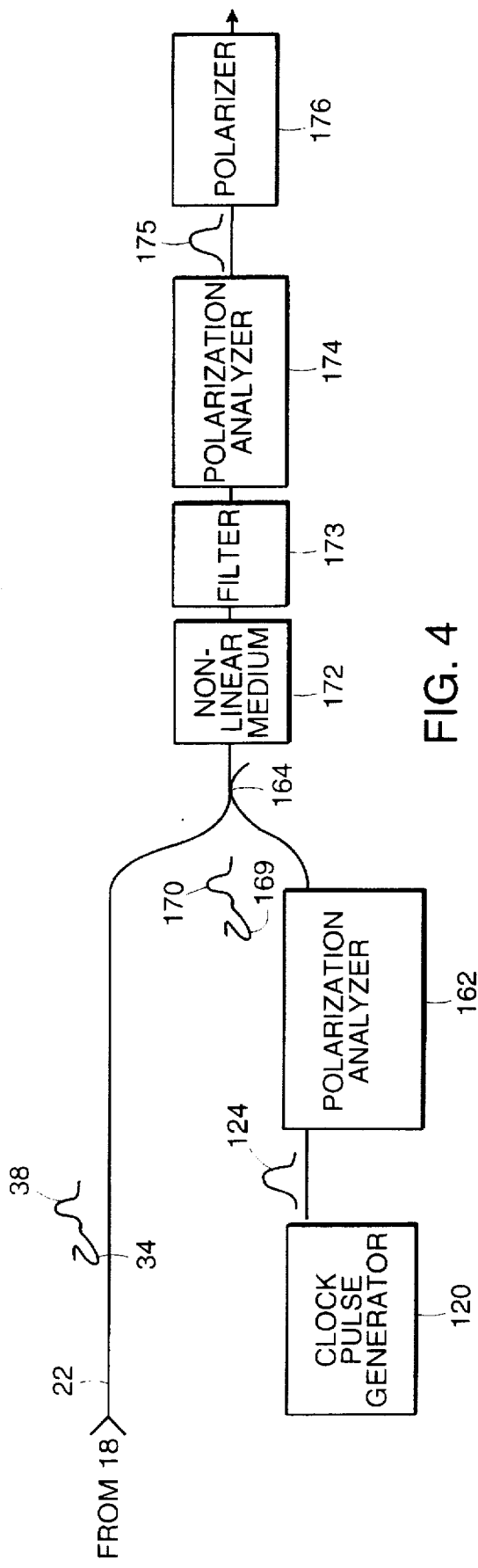
FIG. 4 is a highly schematic diagram of another embodiment of the polarization converting switch and optical pulse generator of the invention shown in FIG. 1.

Referring now to FIG. 4, in yet another embodiment of the invention, the polarization converting switch 26 includes a clock pulse generator 120 which produces periodic clock pulses 124. The clock pulses 124 enter a polarization analyzer 162, such as shown in FIG. 2a, and are split into two orthogonal, equal energy, linearly polarized pulses 169, 170. The delay between the pulses 169, 170 is typically longer than the delay between pulses 34 and 38. The pulses 169, 170 are synchronized with the pulses 34, 38 to permit proper interaction of the pulses in non-linear medium 172. These pulses 169, 170 are combined with pulses 34, 38 from polarization analyzer 18 in coupler 164. Coupler 164 in one embodiment is a dichroic coupler. In another embodiment coupler 164 is a 50:50 coupler. The two sets of orthogonal, linearly polarized, pulses 34, 38 and 169, 170 enter an amplifying or passive non-linear medium 172. In one embodiment, in the non-linear medium 172, the polarization of pulse 170 is ±45° from the polarization of pulse 34. The various time delays are selected such that pulses 34, 38 impart an energy dependent change on pulse 170 relative to pulse 169.

A bandpass filter or dichroic coupler 173 prevents pulses 34, 38 from passing farther along the optical path. Pulses 169, 170 then enter a second polarization analyzer 174. This second polarization analyzer 174, such as the analyzer shown in FIG. 2a, is oriented such so as to recombine pulses 169, 170 into a single pulse 175 if pulses 169, 170 do not experience any differential changes between this analyzer 174 and the previous analyzer 162. The pulse 175 then reaches a polarizer 176 which prevents the pulse from passing through if pulses 169 and 170 have not experienced any differential changes. However, in the non-linear medium 172, pulses 34, 38 impart a change in pulse 170 relative to pulse 169, and as a result, a portion of the recombined pulse 175 passes through polarizer 176.

Figure 4A:
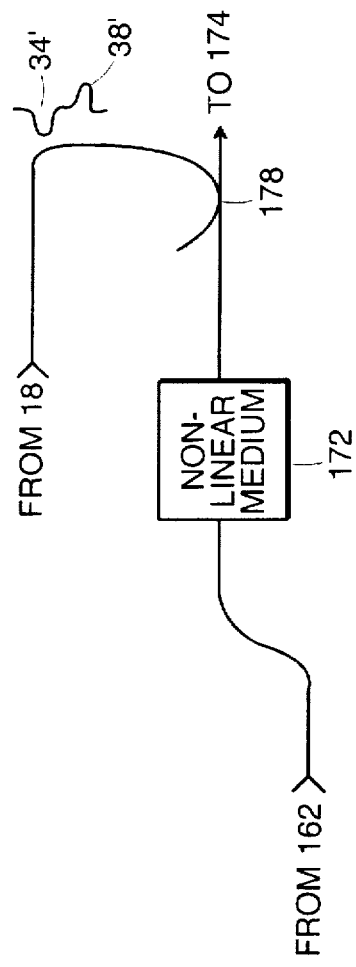
FIG. 4a is another embodiment of a portion of the polarization converting switch of the invention shown in FIG. 4.

Referring to FIG. 4a, another method of preventing pulses 34, 38 from reaching the polarizer 176 is to introduce the pulses 34' and 38' into the optical path by way of coupler 178 positioned after the non-linear medium 172. These pulses 34', 38' propagate backward in the non-linear medium 172 and therefore are not directed toward and hence do not reach the polarizer 176. Again, the delay between pulses 169, 170 is generally greater than the delay between pulses 34' and 38' and pulses 169, 170 are synchronized with pulses 34', 38' so as to properly interact in non-linear medium 172.

Figure 5:
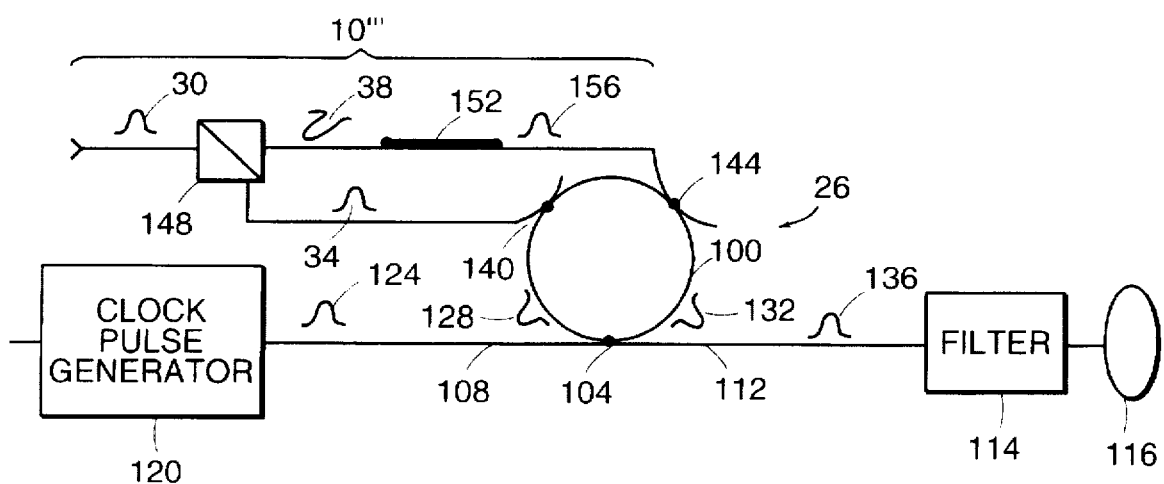
FIG. 5 is a highly schematic diagram of another embodiment of the polarization desensitizer of the invention shown in FIG. 1.

Referring to FIG. 5, in another embodiment of the polarization desensitizer, an input pulse 30 enters a polarization analyzer 10''', which includes a polarizing beam splitter 148, and is divided into two components 38, 34. One of the components 38 enters a polarization rotator 152 which rotates the polarization of the component 38 by 90°. In one embodiment the polarization rotator 152 is a length of optical fiber which has undergone a 90° twist. The polarization rotated pulse 156 becomes one input pulse to a polarization converting switch 26 and the other component 34 from the polarizing beam splitter 148 is the second input pulse to the polarization converting switch.

The polarization converting switch 26 in this embodiment is shown again in the form of a "walk-through" switch 26 described above. However, in this embodiment, the polarization converting switch 26 includes a third coupler 144 in addition to the second coupler 140. The second 140 and third couplers 144, provide the input ports to the loop 100 for the input pulses 34 and 156, respectively. In the embodiment shown, pulses 34, 128, and 156 are copolarized in loop 100. In the region of the loop 100 between dichroic couplers 140 and 144, pulses 34 and 128 pass or "walk" through each other. Pulse 34 then leaves loop 100 at dichroic coupler 144, by which pulse 156 enters the loop 100. Pulse 156 passes or "walks" through pulse 128 in the region of the loop 100 between dichroic coupler 144 and 50:50 coupler 104. In this case, ΔΦ 2E, so the phase-shifting is more efficient than in the previous embodiment, but two walkthroughs are required in the loop 100. As with the embodiment shown in FIG. 3 pulses, 128 and 132 recombine and exit the loop 100 by way of port 108 in the absence of pulses 34 and 156. However, when pulses 34 and 156 are present, pulses 128 and 132 recombine and exit the loop by way of output 112 as a pulse of known polarization 136. In this embodiment pulses 34, 124 and 156 are synchronized so as to permit the proper interaction of the pulses within ring 100.

Although the polarization converting switch 26 has been described in terms of a Sagnac type optical fiber loop, such a switch is not limited to optical fiber. Such a switch can also be constructed of devices which use 3rd order non-linearities, instantaneous non-linearities or polarization independence in amplitude shifting or cross-gain saturation.

Figure 6:
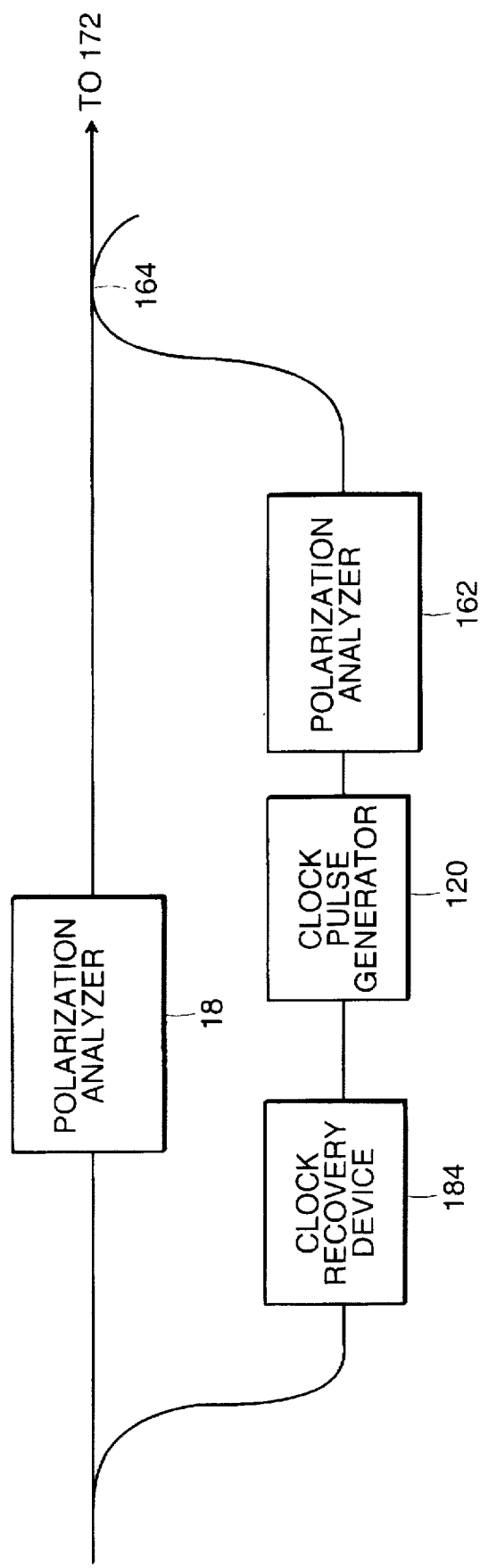
FIG. 6 is a block diagram of an embodiment of the invention used as a regenerator.

In addition to establishing pulses of a fixed polarization, the present invention may also be used as an optical regenerator as shown in FIG. 6. In such an application, the timing and amplitude of pulses may be restored after distortion due to transmission. In the embodiment shown a data stream enters both the polarization analyzer 18 and a clock recovery device 184. The data stream from the clock recovery device 184 is used to ensure that clock pulses from a clock pulse generator 120 have proper timing. The correctly timed pulses then enter a polarization analyzer 162 and the pulses from the polarization analyzer 18 and the polarization analyzer 162 then are combined by coupler 164 and enter non-linear medium 172 as described in FIG. 4. The output from the polarization converting switch is then the input data with a known polarization. In this embodiment the output signals from polarization analyzer 162 and polarization analyzer 18 are synchronized to enable the output signals to properly interact in the non-linear medium 172. Although this embodiment is discussed in terms of the components depicted in FIG. 4, other embodiments using the components of FIGS. 3, 4a and 5 are also contemplated. In each embodiment, a clock recovery device 184 receives a portion of the input data and drives a clock pulse generator 120 to generate clock pulses with the correct timing.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A polarization desensitizer comprising:

a polarization analyzer comprising an input port and a first output port, said input port of said polarization analyzer in communication with a data source providing data pulses;

a pulse generator comprising an output port; and a polarization converting switch comprising an output port, a first input port in communication with said first output port of said polarization analyzer, a second input port in communication with said output port of said pulse generator, said output port of said polarization converting switch producing output pulses of a known polarization in response to said data pulses.

2. The polarization desensitizer of claim 1 wherein said polarization analyzer further comprises a second output port and wherein said polarization converting switch further comprises a third input port, said third input port of said polarization converting switch in communication with said second output port of said polarization analyzer.

3. The polarization desensitizer of claim 1 wherein said polarization converting switch comprises a walk-through switch.

4. The polarization desensitizer of claim 1 wherein said polarization converting switch comprises a nonlinear loop mirror.

5. The polarization desensitizer of claim 1 wherein said polarization converting switch comprises a single arm interferometer.

6. The polarization desensitizer of claim 1 wherein said polarization converting switch comprises a semiconductor switch.

7. The polarization desensitizer of claim 1 wherein said polarization analyzer produces two orthogonally polarized, time-separated, components of each said data pulse.

8. The polarization desensitizer of claim 1 wherein said polarization analyzer comprises a birefringent fiber.

9. The polarization desensitizer of claim 1 wherein said polarization analyzer comprises:

a first polarizing beam splitter comprising a first output port and a second output port and an input port in communication with said data source;

a pulse delayer comprising an output port and an input port in communication with said first output port of said first polarization beam splitter; and a second polarizing beam splitter comprising a first input port in communication with said output port of said pulse delayer, a second input port in communication with said second output port of said first polarizing beam splitter and an output port in communication with said first input port of said polarization converting switch.

10. The polarization desensitizer of claim 9 wherein said pulse delayer provides a negative delay.

11. The polarization desensitizer of claim 1 wherein said first pulse generator is a clock pulse generator.

12. A polarization desensitizer comprising:

a polarization analyzer separating an input pulse into two orthogonally polarized components of light separated by an amount of time; and a nonlinear switch integrating the power of said two orthogonally polarized components of light over time and producing an output pulse having a predetermined polarization.

13. A pulse configure comprising:

a polarization analyzer comprising an input port and a first output port, said input port of said polarization analyzer in communication with a data source providing data pulses;

a first pulse generator comprising an output port; and a polarization converting switch comprising an output port, a first input port in communication with said first output port of said polarization analyzer, a second input port in communication with said output port of said first pulse generator, said output port of said polarization converting switch producing output pulses of a known polarization and energy in response to said data pulses.

14. The pulse configure of claim 13 wherein said first pulse generator is a clock pulse generator and said pulse configure is a pulse regenerator.

15. The pulse configure of claim 13 wherein said polarization converting switch is a walk-through switch.

16. A method for providing a fixed polarization pulse corresponding to an input pulse having an undetermined polarization, said method comprising the steps of:

separating a reference pulse into two components separated in time;

imparting a differential change into one of said components by said input pulse; and recombining said components so as to produce an output pulse of a known polarization.

17. The method of claim 16 wherein said reference pulse comprises a clock pulse.

18. The method of claim 16 wherein said step of imparting a differential change comprises the step of cross-phase modulating said two components.

* * * * *